United States Patent [19]

Urruti

[11] Patent Number: 5,551,967
[45] Date of Patent: Sep. 3, 1996

[54] METHOD FOR CONTROLLING FIBER DIAMETER DURING DRAWING

[75] Inventor: Eric H. Urruti, Wilmington, N.C.

[73] Assignee: Corning Incorporated, Corning, N.Y.

[21] Appl. No.: 428,498

[22] Filed: Apr. 27, 1995

Related U.S. Application Data

[62] Division of Ser. No. 11,384, Jan. 29, 1994, Pat. No. 5,443,610.

[51] Int. Cl.$^6$ .................................................. C03B 37/07
[52] U.S. Cl. .............................. 65/378; 65/382; 65/435; 365/73.1
[58] Field of Search .................... 356/385, 73.1; 364/473; 65/382, 381, 378, 435, 491

[56] References Cited

U.S. PATENT DOCUMENTS

| | | | |
|---|---|---|---|
| 4,102,661 | 7/1978 | Dudderar | 65/382 |
| 4,735,856 | 4/1988 | Schultz | 428/366 |
| 5,237,383 | 8/1993 | Parisi | 356/73.1 |

FOREIGN PATENT DOCUMENTS

| | | | |
|---|---|---|---|
| 53-138748 | 12/1978 | Japan | 65/382 |
| 61-21931 | 1/1986 | Japan | 65/382 |
| 5-97459 | 4/1993 | Japan | 65/435 |

*Primary Examiner*—John M. Hoffmann
*Attorney, Agent, or Firm*—William Greener

[57] ABSTRACT

A system for controlling the drawing of a hermetically-coated optical waveguide fiber from a preform is provided in which two measurements of fiber diameter are made and combined into an overall control signal. The first measurement is made on bare fiber in the region of the preform's root using an interference technique. The second measurement is made after the hermetic coating has been applied using a shadow technique. The first measurement provides high speed, high accuracy data needed for process control and defect detection. It is, however, subject to error due to fluctuations in the root with tractor speed. The second measurement reduces the effects of such error on the overall control signal.

9 Claims, 5 Drawing Sheets

METHOD FOR CONTROLLING FIBER DIAMETER DURING DRAWING

This is a division of application Ser. No. 08/011,384, filed Jan. 29, 1994 now U.S. Pat. No. 5,443,610.

FIELD OF THE INVENTION

This invention relates to methods and apparatus for controlling the diameter of an optical waveguide fiber during the drawing process.

BACKGROUND OF THE INVENTION

Techniques for drawing optical waveguide fibers are well known in the art. See, for example, DiMarcello et al., "Fiber Drawing and Strength Properties," Optical Fiber Communications, ed. T. Li, Vol. 1, Academic Press Inc., pages 179–248 (1985) and the references cited therein.

A schematic of an optical fiber drawing line is shown in FIG. 1. Furnace 50 heats preform 10 to a temperature great enough to allow bare fiber 13 to be drawn therefrom by tractor mechanism 32.

Bare fiber diameter monitor 52 in combination with a suitable process control system ensures that the bare fiber is drawn to a specified outside diameter, e.g., 125 microns. In order to provide rapid, high accuracy measurements of the fiber diameter, monitor 52 generally employs an optical technique of the interference type as disclosed in Watkins, U.S. Pat. Nos. 3,982,816 and 4,067,651. See also Murphy et al., U.S. Pat. No. 4,280,827. Since such monitors use an interference pattern to make the diameter measurement, they are often referred to as "IDMs".

Hermetic coating reactor 54 is used to coat the fiber with a thin hermetic coating, e.g., a carbon coating having a thickness of around 500 angstroms. See, for example, DiMarcello et al., U.S. Pat. No. 5,000,541, Ishiguro et al., U.S. Pat. No. 5,035,484, and Schultz et al., U.S. Pat. No. 4,735,856. Such coatings have been found to reduce absorption of water and hydrogen into the fiber.

Hermetic coating monitor 64 in combination with the process control system ensures that the hermetic coating has a substantially constant thickness. Kingsbury, U.S. Pat. No. 5,142,228, shows a suitable construction for such a monitor. Other monitors are disclosed in Frazee, Jr. et al., U.S. Pat. No. 4,952,226, Atkins et al., U.S. Pat. No. 5,013,130, Inoue et al., "Development of Non-Contact Coating Thickness Monitor for Hermetically Carbon Coated Fiber," *Conference Digest* for the proceedings of the Optical Fibre Measurement Conference, September 1991, York, England, pages 135–138, and commonly assigned, copending application Ser. No. 08/011,393, filed Jan. 29, 1993 now U.S. Pat. No. 5,408,308 and entitled "Method for Monitoring Hermetically-Coated Fibers."

Protective coating applicator 56 in combination with curing apparatus 58 applies a protective coating, e.g., a UV-curable acrylate coating, to the hermetically-coated fiber. Coated fiber diameter monitor 60 is used to control this process. Application of the protective coating completes the drawing process and the finished fiber 22 is collected on a take-up spool or reel for storage and distribution.

THE PROBLEMS ADDRESSED BY THE INVENTION

The present invention is concerned with problems associated with IDM 52 and hermetic coater 54. Specifically, the invention is concerned with problems arising from the following facts:

1) hermetic coater 54 is preferably placed close to furnace 50 so that the heat of the fiber exiting the furnace can be used to induce the chemistry required for coating application;

2) hermetic coatings and, in particular, carbon coatings, are effective absorbers of light; and 3) the interference pattern used by IDM 52 to determine fiber diameters requires that light passes through the body of the fiber and thus in some cases, the IDM measurement needs to be made before the hermetic coating has been applied to the fiber.

Note that the diameter measurement technique disclosed in commonly assigned U.S. patent application Ser. No. 07/816,882, filed Dec. 31, 1991, now U.S. Pat. No. 5,309,221 and entitled "Measurement of Fiber Diameters with High Precision" can measure the diameter of a hermetically-coated fiber, i.e., an IDM of this type can be placed after coater 54. However, even this technique, although significantly more robust than prior techniques, becomes susceptible to error as the coating thickness becomes large.

As a result of these facts, a desirable location for IDM 52 is just after furnace 50. As a result of this placement, in high speed fiber drawing operations, the bare fiber being measured is not fully formed, e.g., for a fiber designed to have a fully-formed diameter of 125 microns, the diameter at the location of the IDM may be on the order of 130 microns. This would not be a problem if there were a constant relationship between the diameter at the point of measurement and the final diameter. Unfortunately, this is not the case.

FIG. 2 shows the results of an experiment in which fiber diameter measured by an IDM located close to furnace 50 was used as the controlling parameter for fiber drawing with the controlled variables being preform (glass) feed and draw (tractor) speed. The overall control loop used is shown in FIG. 3. As shown in this figure, the control system employed both a target draw speed and a target fiber diameter.

To evaluate the performance of the IDM, the diameter of the fully-formed fiber was measured after hermetic coater 54 using a commercially available diameter monitor manufactured by Anritsu Corporation, c/o Anritsu America Inc., 15 Thornton Road, Oakland, N.J., 07426. This monitor uses a shadow technique rather than an interference technique and thus can measure the diameter of a hermetically-coated fiber without special measures. By averaging a series of measurements, the shadow technique can provide diameter measurements of good accuracy. The average, however, needs to be made over a period of time on the order of a second which makes this technique unsuitable for the high speed diameter measurements needed for process control. IDMs, on the other hand, are capable of providing high speed and high accuracy. Also, they can be used to detect fiber defects, a capability not shared by shadow measuring techniques. See commonly assigned, copending application Ser. No. 07/816,883, filed Dec. 31, 1991, now U.S. Pat. No. 5,185,636 and entitled "Method for Detecting Defects in Fibers."

As shown in FIG. 2, the Anritsu diameter measurements and the IDM-controlled tractor speed were found to be 180° out of phase, i.e., just the opposite of what they should be. That is, when the diameter was getting large, the IDM, through the control system, was telling the tractor mechanism to slow down which is just the opposite of what was needed to reduce the fiber diameter. Conversely, when the diameter was getting smaller, the IDM told the tractor mechanism to speed up, again the opposite of what was needed.

This effect can be understood by considering the behavior of the root of the preform. As the tractor increases in speed, the root elongates which means that the IDM sees a larger diameter thus causing it to call for an even larger increase in speed. Note that runaway is avoided since as discussed above, the overall control system has a glass feed rate control and a target draw speed in addition to a target diameter.

The behavior of the preform root was further examined by transferring control to the Anritsu monitor and recording the diameters measured by the IDM. The results are shown in FIG. 4 where it can be seen that the tractor speed and the IDM diameter are proportional. That is, as the tractor speed increases, the root elongates and the IDM measures an increase in diameter.

This observed increase in measured diameter with increased tractor speed has also been reported in Yoshimura et al., U.S. Pat. No. 5,073,179. Yoshimura's response was to take the obvious step of simply moving the diameter measuring equipment further from the furnace as the speed increased. Plainly, such an approach does not deal with need to place an IDM ahead of a hermetic coater and the need to place the hermetic coater close to a furnace. The present invention addresses these needs.

SUMMARY OF THE INVENTION

In view of the foregoing, it is an object of the present invention to provide improved methods and apparatus for controlling fiber diameter during drawing. More particularly, it is an object of the invention to provide methods and apparatus whereby an IDM can be used to provide high speed, sub-second control of the drawing of a hermetically-coated fiber. It is a further object of the invention to provide methods and apparatus whereby a non-IDM diameter measuring system, e.g., a shadow-type system, can be used in conjunction with an IDM to provide overall control of fiber diameter.

To achieve these and other objects, the invention in accordance with certain of its aspects provides a method and associated apparatus for producing an optical fiber from a preform by:

(1) heating the preform and drawing a fiber therefrom, the drawn fiber having a first region, i.e., the root region, where the fiber is not fully formed;

(2) producing a first signal indicative of the diameter of the fiber in the first region;

(3) coating the fiber with a light absorbing coating, e.g., a carbon coating, to form a coated fiber;

(4) producing a second signal indicative of the diameter of the coated fiber;

(5) producing a control signal from the first and second signals; and (6) controlling the diameter of the fiber by means of the control signal.

In the preferred embodiments of the invention, the first signal is produced by an IDM so as to provide high speed, sub-second data suitable for performing statistical calculations to ensure fiber quality as well as to provide information regarding defects in the fiber, and the second signal is produced by a non-IDM diameter measuring device such as one employing a fiber shadow technique. In practice, the combination of these two diameter measuring devices has been found to result in a dramatic improvement in diameter control compared to that achieved by an IDM alone.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

Figure 1:
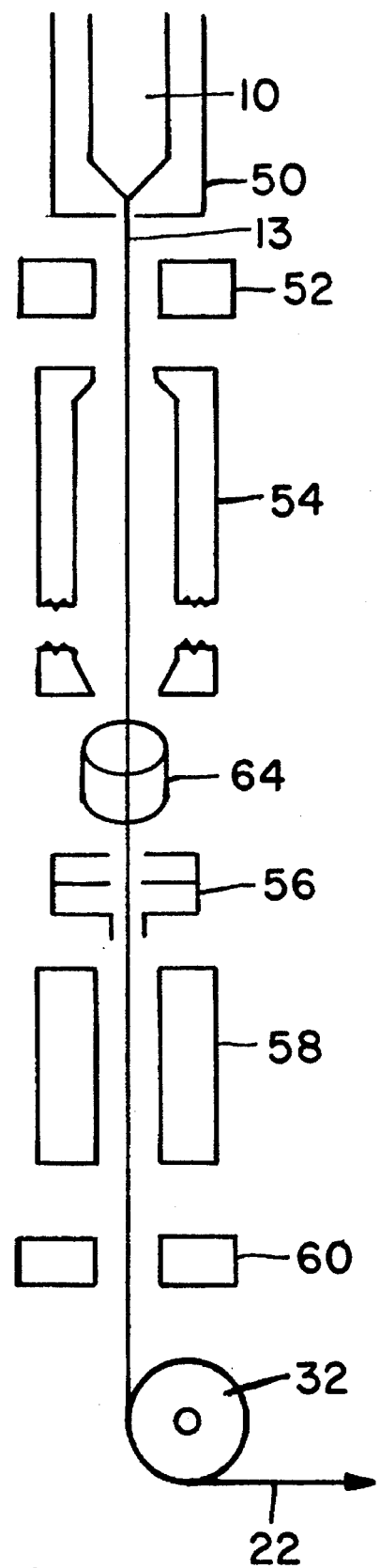
FIG. 1 is a schematic diagram of an optical fiber drawing line.
Figure 2:
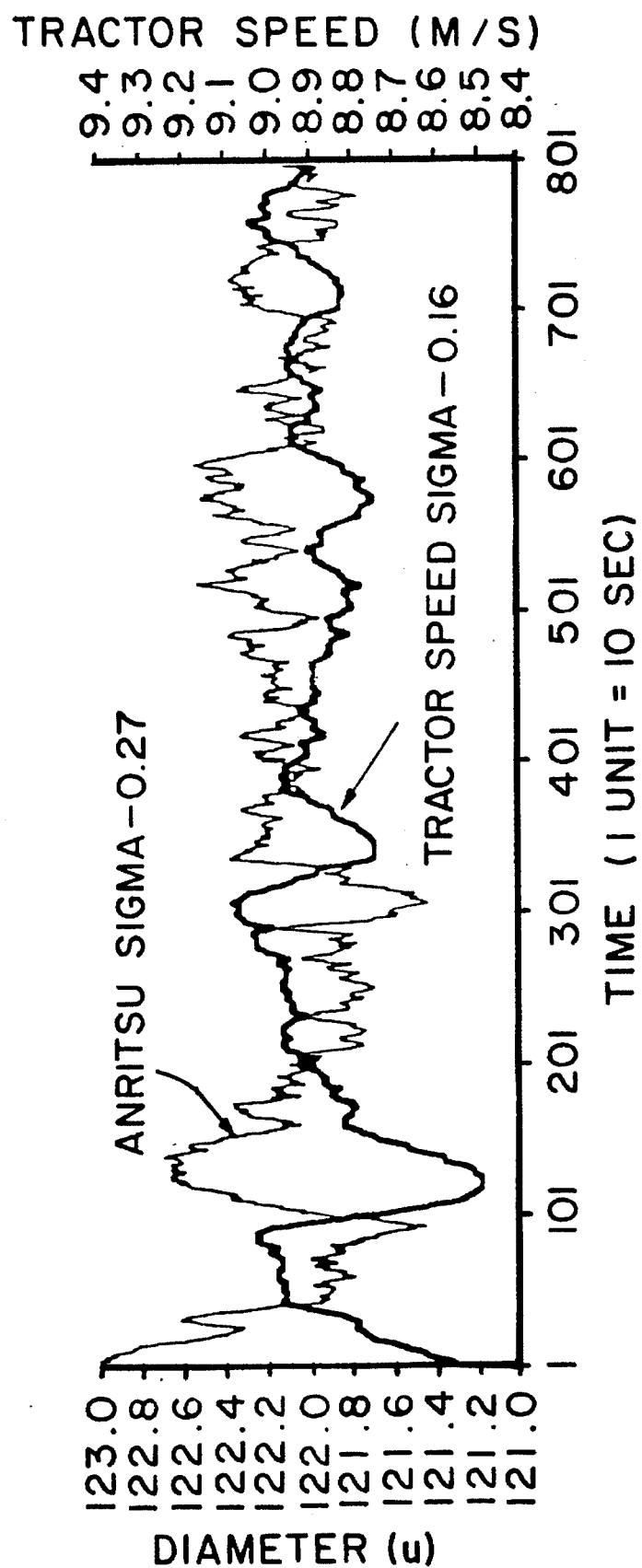
FIG. 2 is a plot of fiber diameter measured by a shadow measuring device (Anritsu) versus time and of tractor speed versus time for a draw line controlled by an IDM located between furnace 52 and hermetic coater 54 in FIG. 1. The Anritsu was located between hermetic coater 54 and protective coater 56 in FIG. 1.

As discussed above, the present invention relates to controlling the drawing of optical waveguide fibers by measuring fiber diameters at two locations and combining those measurements to produce an overall control signal.

The first diameter measurement is made between drawing furnace 50 and hermetic coater 54 and preferably employs an interference technique in which the fiber is illuminated with a beam of radiation so as to produce an interference pattern and the interference pattern is analyzed to produce a signal indicative of the diameter of the fiber.

The analysis of the interference pattern can comprise fringe counting as in the Watkins and Murphy et al. patents referred to above or analysis of a spatial frequency spectrum derived from the fringe pattern as in the above referenced application entitled "Measurement of Fiber Diameters with High Precision." See also Mustafa A. G. Absuhagur and Nicholas George, "Measurement of optical fiber diameter using the fast Fourier transform," *Applied Optics*, Vol. 19, pages 2031–2033 (1980). In addition to providing accurate, high speed measurements of fiber diameter, the analysis of the interference pattern should also preferably provide information about defects in the fiber. As discussed in the above referenced application entitled "Methods for Detecting Defects in Fibers," such defect detection can be based directly on the fringe pattern or can be based on an analysis of the spatial frequency spectrum.

The second diameter measurement is made between hermetic coater 54 and protective coater 56. With reference to FIG. 1, this measurement can be made either before or after hermetic coating monitor 64. Since the fiber has been hermetically-coated at this point, the technique used for this measurement must be operable in the presence of such a coating. One suitable approach is the shadow technique employed in the commercial Anritsu monitor. In accordance with this approach, a beam of radiation is directed at the fiber and the shadow produced by the fiber is detected and analyzed to produce a signal indicative of the fiber's diameter. In the Anritsu device, a tuning-fork is used to sweep a thin beam of light across the width of the fiber and the presence or absence of light at a detector as a function of time is used to locate the edges of the fiber's shadow.

The first and second diameter measurements will differ from one another because of the locations at which they are made. In particular, because the fiber is not fully foiled at the first measurement location, the nominal diameter at that location will be larger than the nominal diameter at the second location where the fiber has been fully formed. Note that this relationship will exist even though the fiber includes a hermetic coating at the second location. That coating typically has a thickness on the order of 500 angstroms (0.05 microns) while the nominal diameters at the first and second locations are typically more than 2,000 times larger, e.g., on the order of 130 microns and 125 microns for the first and second locations, respectively.

Figure 3:
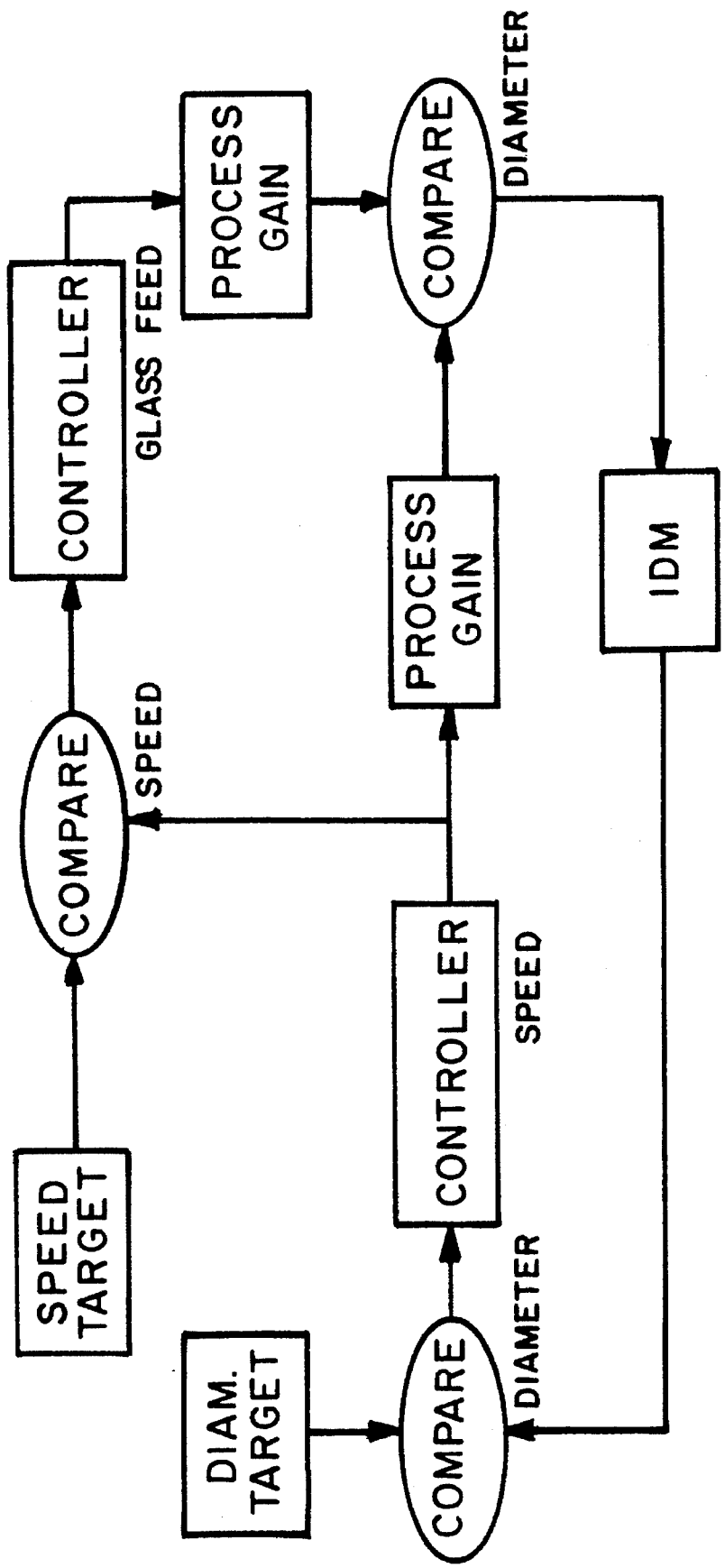
FIG. 3 is a block diagram of the control system used to prepare FIGS. 2 and 4.
Figure 4:
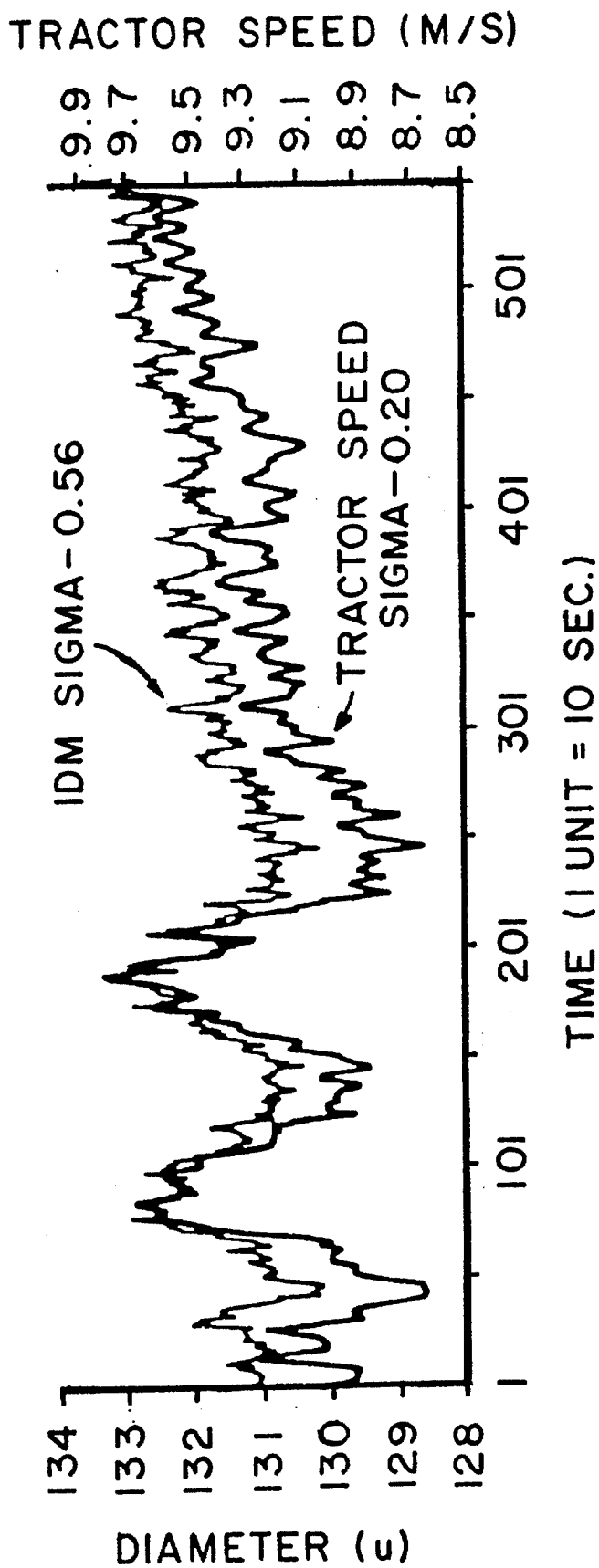
FIG. 4 is a plot of fiber diameter measured by an IDM versus time and of tractor speed versus time for a draw line with a shadow measuring device (Anritsu) located between hermetic coater 54 and protective coater 56 in FIG. 1. The IDM was located between furnace 52 and hermetic coater 54 in FIG. 1.
Figure 5:
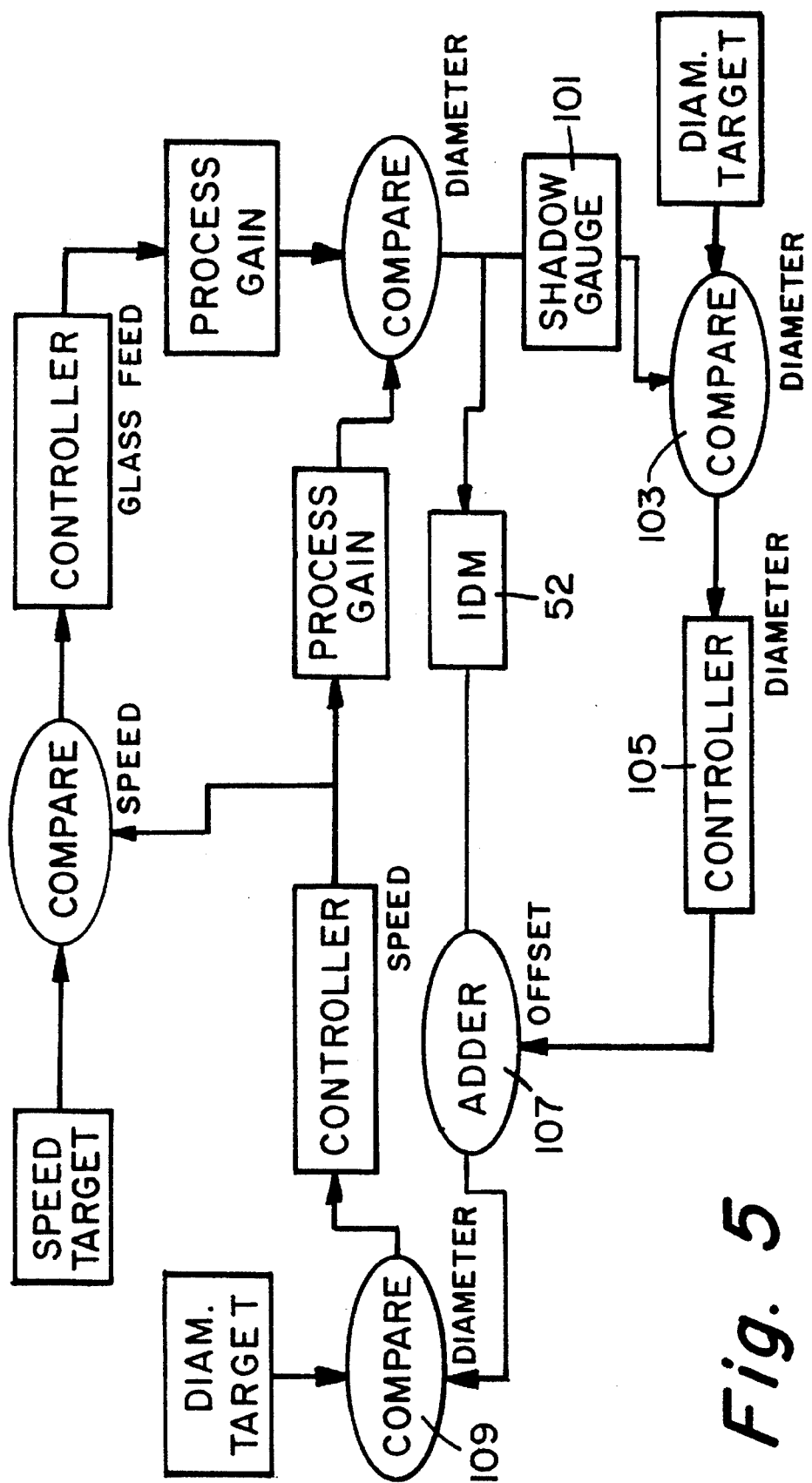
FIG. 5 is a block diagram of a control system for use with the present invention.

The diameter measurements at the first and second locations ($D_1$ and $D_2$) are combined to form an overall control signal for the drawing process. A suitable control system for making this combination is shown in FIG. 5. A comparison of this control system with the conventional control system of FIG. 3 shows that the additional components are shadow gauge 101, e.g., an Anritsu diameter monitor, comparator 103, controller 105, and adder 107.

Shadow gauge 101 produces the $D_2$ measurement. Comparator 103 compares this measurement with a target value to determine if the diameter is within a normal range. If not, an alarm is activated.

If $D_2$ is within range, its value is passed to controller 105 which calculates an offset (see below). The offset is passed to adder 107 where it is added to the $D_1$ value obtained from IDM 52 to produce the desired overall control signal. This signal is passed to comparator 109 where it is compared with the target value for the fiber's diameter. Thereafter, control of the drawing process based on tractor speed and preform feeding is the same as in FIG. 3.

Controller 105 calculates the offset using the $D_1$ and $D_2$ values from the IDM and shadow gauge as follows:

$$Offset_n = Offset_{n-1} - K(D_2 - D_1)$$

where $Offset_n$ and $Offset_{n-1}$ are the offsets at times n and n-1, which can be, for example, 1 second apart, and K is a constant which serves to provide control stability. In practice, a value for K of 0.2 has been found to work successfully in the drawing of 125 micron fiber with offset values lying in the range from −3 to −7 microns.

COMPARATIVE EXAMPLE

A comparison was made between the uniformity of fiber drawn using the conventional control system of FIG. 3 with diameter measurements provided by an IDM located between furnace 50 and hermetic coater 54 and fiber drawn under comparable conditions but with the control system of FIG. 5 and the addition of shadow gauge 101 between hermetic coater 54 and hermetic coating monitor 64 in FIG. 1.

Mean diameter values, standard deviations, and Cpk values were determined based on 41 preforms drawn using the conventional system and 35 preforms drawn using the invention. Cpk values were determined by computing the magnitude of the difference between the mean diameter value and the nearest specification limit and dividing the result by three times the standard deviation. For these experiments, the fiber diameter specification was 125μ±2μ. A Cpk value greater than about 1.33 indicates good process control.

The values for the conventional system were: mean diameter=125.13; sigma=0.62; Cpk=1.00. Those for the invention were: mean diameter=125.22; sigma=0.22; Cpk=2.74. The marked improvement achieved by the invention is evident from this data.

Although preferred and other embodiments of the invention have been described herein, other embodiments may be perceived by those skilled in the art without departing from the scope of the invention as defined by the following claims.

What is claimed is:

1. A method for producing an optical fiber from a preform comprising the steps of:

heating the preform and drawing a fiber therefrom, said drawn fiber having a region where the fiber is not fully formed;

producing a first signal indicative of the diameter of the fiber in the region where it is not fully formed;

coating the fiber with a light absorbing coating to form a coated fiber;

producing a second signal indicative of the diameter of the coated fiber;

producing a control signal from the first and second signals; and controlling the diameter of the fiber by means of the control signal.

2. The method of claim 1 wherein the first signal is generated by:

directing a beam of radiation at the fiber so as to produce an interference pattern; and analyzing the interference pattern to produce the first signal.

3. The method of claim 1 wherein the second signal is generated by:

directing a beam of radiation at the fiber to produce a shadow of the fiber; and analyzing the shadow to produce the second signal.

4. A method for controlling the diameter of an optical fiber during drawing comprising:

generating a first signal indicative of the diameter of the fiber at a first location;

generating a second signal indicative of the diameter of the fiber at a second location, the nominal diameter of the fiber at the second location being smaller than the nominal diameter of the fiber at the first location;

generating a control signal from the first and second signals; and controlling the diameter of the fiber by means of the control signal.

5. The method of claim 4 wherein the first signal is generated by:

illuminating the fiber with a beam of radiation so as to produce an interference pattern; and analyzing the interference pattern to produce the first signal.

6. The method of claim 4 wherein the second signal is generated by:

directing a beam of radiation at the fiber to produce a shadow of the fiber; and analyzing the shadow to produce the second signal.

7. The method of claim 4 wherein the fiber is not fully formed at the first location.

8. The method of claim 4 wherein the fiber is fully formed at the second location.

9. The method of claim 4 wherein a light absorbing coating is applied to the fiber between the first and second locations.

* * * * *